Dec. 18, 1956  D. J. FINN  2,774,176
CRUSTACEAN TRAP
Filed Aug. 11, 1955
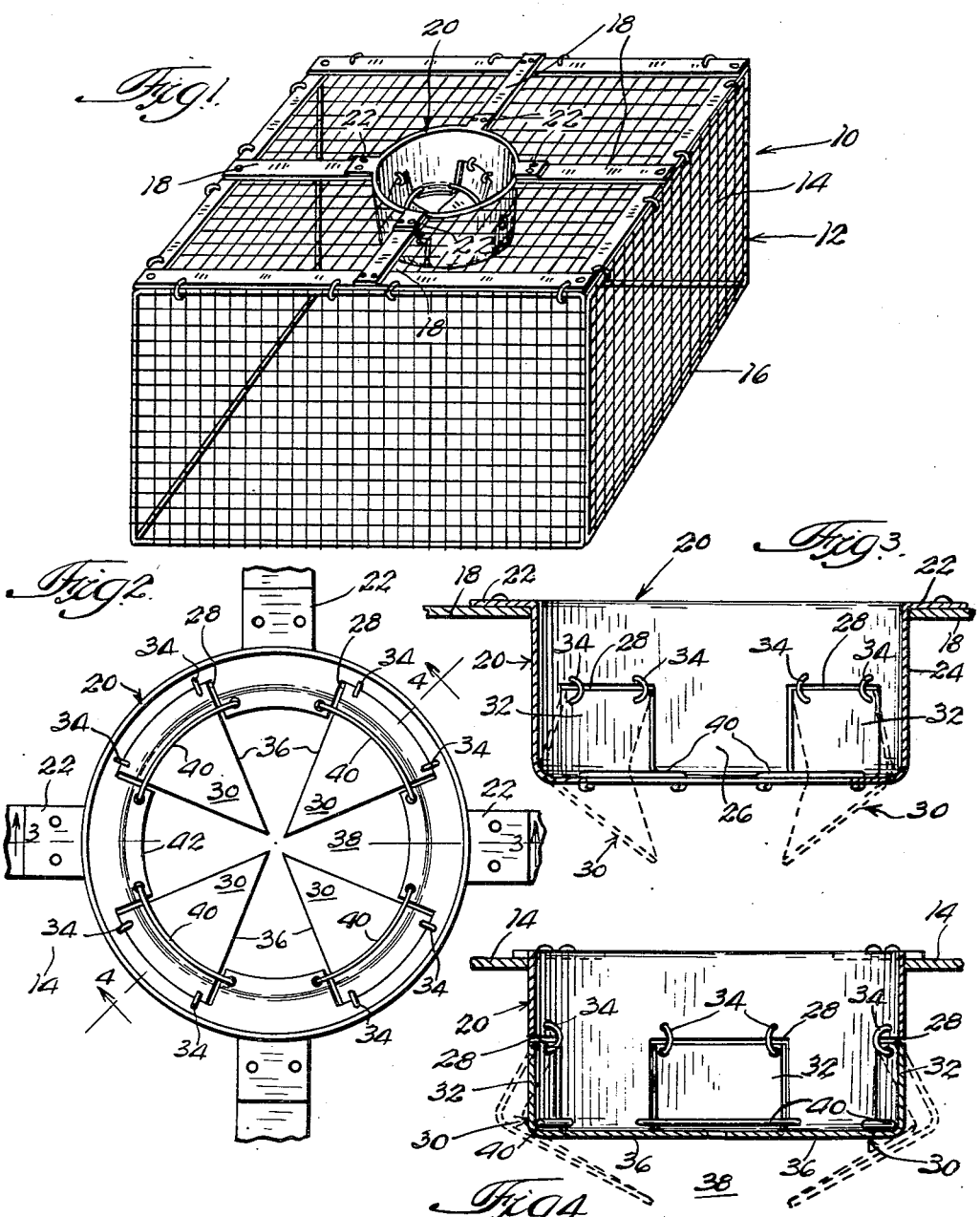
INVENTOR.
Dennis J. Finn.
BY
Thiess, Olson, Mecklenburger,
von Holst & Coltman
ATTYS.

United States Patent Office 2,774,176
Patented Dec. 18, 1956

2,774,176

CRUSTACEAN TRAP

Dennis J. Finn, Chicago, Ill.

Application August 11, 1955, Serial No. 527,814

4 Claims. (Cl. 43—69)

This invention relates to an improved trapping device and more particularly to a device for trapping Crustacea and the like.

This invention has as an object the provision of a trap construction employing a novel inlet mechanism adapted to ready opening by a Crustacea attempting to enter the trap and constructed to prevent the Crustacea from escaping therefrom.

It is another object of this invention to provide a trap for Crustacea which need not be reset after each catch and which may be constructed in any desired size to hold any desired number of Crustacea.

It is the further object of this invention to provide a trap construction from which the trapped Crustacea may be readily removed and which is of simple construction and which may be economically manufactured.

These and other objects will become more manifest from the following description, the accompanying drawings and the appended claims.

According to one embodiment of this invention, there is provided a device for trapping Crustacea including a foraminous housing and an inlet mechanism disposed in a surface thereof, said inlet mechanism comprising a frame member defining an opening into said housing, and weight-sensitive means for permitting ingress and preventing egress of said Crustacea through said opening, said means comprising a plurality of depending members pivotally suspended from said frame member and cooperating in the normal suspended position thereof to obstruct said opening, said depending members being movable downwardly by said Crustacea to permit ingress through said opening and movable upwardly by said Crustacea attempting egress through said opening, and means for limiting the upward movement of said depending members to prevent egress of said Crustacea.

For a more complete understanding of the invention, reference will now be made to the drawing wherein:

Figure 1 is a perspective view of one embodiment of the crustacean trap provided by this invention;

Fig. 2 is a fragmentary enlarged plan view of the inlet mechanism of the invention shown in Fig. 1;

Fig. 3 is a sectional view taken along line 3—3 of Fig. 2; and

Fig. 4 is a sectional view taken along line 4—4 of Fig. 2.

Referring now to the drawing, and more particularly to Fig. 1, there is provided a trapping device 10 comprising a foraminous housing 12 which may be fabricated of wire mesh 14 supported by and secured to a rectangular framework 16. This framework includes suitable supporting members 18 for supporting the inlet mechanism 20 disposed in the top of the trap 10 and which is secured to the supporting members 18 by laterally-extending lugs 22 overlying the inner ends of members 18.

As seen best in Figs. 3 and 4, the inlet mechanism 20 consists of a cylindrical wall member 24, which may be formed of sheet metal, which extends downwardly from the top surface of the trap and defines an opening into the trap. The lower portion 26 (Figs. 2 and 3) of the wall 24 is provided with a plurality of spaced-apart recesses 28 adapted to receive a plurality of weight-sensitive depending members 30 therein. The depending members 30 comprise upper portions 32 which are pivotally connected by means of rings 34 to the wall 24 at the top of the recesses 28 therein. The rings are received through apertures provided in the wall and depending members 30. The depending members 30 also comprise lower portions 36 which are disposed substantially perpendicular to the upper portions 32 and which, in the normal suspended position of the depending members 30 (as shown in outline in Figs. 3 and 4), partially obstruct opening 38 at the lower end thereof.

In the trapping operation, a Crustacea (not shown) can see any suitable bait (not shown) inside the trap and may enter the trap downwardly through the opening 38 merely by moving the lower portions 36 of depending members 30 downwardly and radially outwardly upon coming into contact therewith whereby the opening 38 becomes unobstructed by the lower portions 36 of the depending members to permit the Crustacea to enter the trap. Once the Crustacea has completely passed through the opening 38, the depending members 30, as a result of their balance, automatically pivot back to their normal suspended position. When the Crustacea later attempts to escape from the trap through the opening 38, it is unable to do so because the opening is again partially blocked by the lower portions 36 of the depending members, which cooperate to block the opening, and any force exerted by the Crustacea in an upward direction against the lower portions 36 of the depending members merely forces these lower portions upwardly and radially inwardly to more completely block off the opening 38, since the upward movement of the lower portions of the depending members is limited by a plurality of links 40 as shown in Figs. 2 and 4. The links 40 are disposed above the lower portions of the depending members and span the lower portions of the recesses 28 in the wall 24 and are secured at each end adjacent the bottom edge 42 of the wall. Although the trapped Crustacea thus cannot escape from the trap by its own efforts, it may be readily removed therefrom by the fisherman by providing for the bottom or a side of the trap to open on hinges (not shown) or by providing an additional access (not shown) operable only by the fisherman.

While a particular embodiment of the invention has been shown, it will be understood, of course, that the invention is not limited thereto since many modifications may be made. It is therefore contemplated to cover, by the appended claims, any and all such modifications as fall within the true spirit and scope of this invention.

The invention having thus been described, what is claimed and desired to be obtained by Letters Patent is:

1. A device for trapping Crustacea including a foraminous housing and an inlet mechanism disposed in a surface thereof, said inlet mechanism comprising a frame member including a downwardly extending wall defining an opening into said housing, a plurality of spaced-apart recesses in the lower portion of said wall, and weight-sensitive means for permitting ingress and preventing egress of said Crustacea through said opening, said weight-sensitive means comprising a plurality of depending members, said depending members having upper portions pivotally suspended in said recesses and being substantially complementary to the lower portion of said wall when said depending members are in closed position to prevent egress of said Crustacea through said opening, said depending members also having lower portions extending generally inwardly from said upper portions and cooperating in the normal suspended position of said depending members to obstruct said opening.

2. A device for trapping Crustacea including a foraminous housing and an inlet mechanism disposed in a surface thereof, said inlet mechanism comprising a frame member including a downwardly extending wall defining an opening into said housing, a plurality of spaced-apart recesses in the lower portion of said wall, weight-sensitive means for permitting ingress and preventing egress of said Crustacea through said opening, said weight-sensitive means comprising a plurality of depending members, said depending members having upper portions pivotally suspended in said recesses and being substantially complementary to the lower portion of said wall when said depending members are in closed position to prevent egress of said Crustacea through said opening, said depending members also having lower portions extending generally inwardly from said upper portions and cooperating in the normal suspended position of said depending members to obstruct said opening, said lower portions being movable downwardly by said Crustacea to permit ingress through said opening and movable upwardly by said Crustacea attempting egress through said opening, and means for limiting the upward movement of said lower portions to prevent egress of said Crustacea.

3. A device for trapping Crustacea including a foraminous housing and an inlet mechanism disposed in a surface thereof, said inlet mechanism comprising a frame member including a downwardly extending wall defining an opening into said housing, a plurality of spaced-apart recesses in the lower portion of said wall, and weight-sensitive means for permitting ingress and preventing egress of said Crustacea through said opening, said weight-sensitive means comprising a plurality of depending members, said depending members having upper portions pivotally suspended in said recesses and being substantially complementary to the lower portion of said wall when said depending members are in closed position to prevent egress of said Crustacea through said opening, said depending members also having lower portions extending generally inwardly from said upper portions and cooperating in the normal suspended position of said depending members to obstruct said opening, said lower portions being movable downwardly by said Crustacea to permit ingress through said opening and movable upwardly by said Crustacea attempting egress through said opening, and means for limiting the upward movement of said lower portions to prevent egress of said Crustacea, said limiting means comprising links spanning said recesses and disposed above said lower portions of said depending members.

4. A device for trapping Crustacea including a foraminous housing and an inlet mechanism disposed in a surface thereof, said inlet mechanism comprising a frame member including a downwardly extending and generally tubular wall defining a circular opening into said housing, a plurality of spaced-apart recesses in the lower portion of said wall, weight-sensitive means for permitting ingress and preventing egress of said Crustacea through said opening, said weight-sensitive means comprising a plurality of depending members, said depending members having upper portions pivotally suspended in said recesses and being substantially complementary to the lower portion of said wall when said depending members are in closed position to prevent egress of said Crustacea through said opening, said depending members also having substantially triangular lower portions having their apexes disposed generally downwardly and inwardly of said upper portions and cooperating in the normal suspended position of said depending members to obstruct said opening, said lower portions being movable downwardly by said Crustacea to permit ingress through said opening and movable upwardly by said Crustacea attempting egress through said opening, and means for limiting the upward movement of said lower portions to prevent egress of said Crustacea.

References Cited in the file of this patent

UNITED STATES PATENTS

| 1,424,827 | Kendzierski | Aug. 8, 1922 |
| 1,514,770 | Kilchar | Nov. 11, 1924 |
| 2,530,449 | Bush | Nov. 21, 1950 |

FOREIGN PATENTS

| 15,030 | Great Britain | 1914 |
| 16,889 | Great Britain | 1898 |